(12) United States Patent
Shi et al.

(10) Patent No.: US 9,720,176 B2
(45) Date of Patent: Aug. 1, 2017

(54) LOW-LOSS HIGH-REPETITION-RATE PULSED LASER MODULATOR

(71) Applicant: TIANJIN OPTERA LASER TECHNOLOGY CO., LTD., Tianjin (CN)

(72) Inventors: Wei Shi, Tianjin (CN); Zhenhua Yu, Tianjin (CN); Xinzheng Dong, Tianjin (CN)

(73) Assignee: TIANJIN OPTERA LASER TECHNOLOGY CO., LTD., Tainjin (CN)

( * ) Notice: Subject to any disclaimer, the term of this patent is extended or adjusted under 35 U.S.C. 154(b) by 0 days.

(21) Appl. No.: 15/001,244

(22) Filed: Jan. 20, 2016

(65) Prior Publication Data
US 2017/0153466 A1    Jun. 1, 2017

(51) Int. Cl.
G02B 6/28    (2006.01)
G02F 1/01    (2006.01)
H01S 3/00    (2006.01)

(52) U.S. Cl.
CPC .......... *G02B 6/2861* (2013.01); *G02B 6/2804* (2013.01); *G02F 1/011* (2013.01); *H01S 3/0085* (2013.01)

(58) Field of Classification Search
CPC .................................................... G02B 6/2861
See application file for complete search history.

(56) References Cited

U.S. PATENT DOCUMENTS

| 5,572,611 | A | * | 11/1996 | Jinguji | G02B 6/12007 385/17 |
| 6,356,677 | B1 | * | 3/2002 | Hall | G02B 6/2861 359/290 |
| 6,961,492 | B2 | * | 11/2005 | Doerr | G02B 6/12007 385/15 |
| 2003/0053167 | A1 | * | 3/2003 | Xu | G02B 6/29386 398/79 |
| 2010/0046065 | A1 | * | 2/2010 | Little | G02B 6/12007 359/337.1 |
| 2012/0250028 | A1 | * | 10/2012 | Schmitt | G02B 6/2861 356/492 |

* cited by examiner

*Primary Examiner* — Jerry Rahll
(74) *Attorney, Agent, or Firm* — Wayne & King LLC

(57) ABSTRACT

The present invention provides a low-loss high-repetition-rate pulsed laser modulator comprising: a 2*2, 1:1 coupler; a light delay module; a 1*2, 1:1 coupler. The present invention can modulate a low-repetition-rate pulsed laser to be a high-repetition-rate pulsed laser. The basic principle is: one beam of low-repetition-rate pulsed laser can be divided into two beams with the same light intensity by a 1*2, 1:1 coupler; control the two beams of light to have an optical path difference so that when they are coupled into a 2*2, 1:1 coupler, a double pulse repetition rate can be obtained; In the same way, when the two beams of light from former 2*2, 1:1 coupler, with another different optical path difference are coupled into the next 2*2, 1:1 coupler, a double pulse repetition rate can be obtained again; when we obtain the repetition rate we need, a 1*2, 1:1 coupler instead is connected to couple the two beams of light into one beam with a double repetition rate.

1 Claim, 1 Drawing Sheet

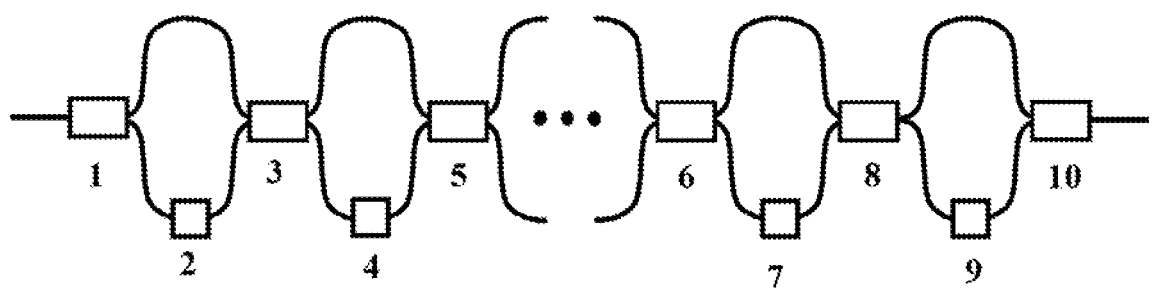

LOW-LOSS HIGH-REPETITION-RATE PULSED LASER MODULATOR

CROSS-REFERENCE TO RELATED APPLICATIONS

This application is a continuation of, and claims priority to, Chinese Patent Application No. 201510853580.3 with a filing date of Dec. 1, 2015. The content of the aforementioned application, including any intervening amendments thereto, is incorporated herein by reference.

TECHNICAL FIELD

The present invention relates to a technical field of pulsed modulators, and the low-loss high-repetition-rate pulsed laser modulator belongs to the fiber and laser technology.

BACKGROUND OF THE PRESENT INVENTION

In recent years, pulsed lasers with high repetition rate have been widely used in many fields, such as optical frequency measurement, high-speed electro-optic sampling, laser ranging, and high-average-power ultrafast lasers. Therefore, it has important application values. For the conventional fiber lasers, it is easier to realize a pulse sequence from kHz to hundreds of MHz. However, for the reason the fiber lasers are limited to its gain fiber length, other inner devices and the length of tail fiber, it is difficult to increase the repetition rate.

This invention puts forward a novel method to increase pulsed laser repetition rate by using a 2*2 type, splitting ratio 1:1 coupler (hereinafter written as 2*2, 1:1 coupler) and controlling the optical path difference to realize a low-loss mutual coupling of laser pulses.

SUMMARY OF THE PRESENT INVENTION

To solve the above problem, the purpose of the present invention is to provide a low-loss high-repetition pulsed laser modulator with simple devices, a compact structure and novel combination.

The present invention provides a low-loss high-repetition pulsed laser modulator, including: two 1*2 type, splitting ratio 1:1 (hereinafter written as 1*2, 1:1 coupler), N 2*2, 11 couplers, and N light delay modules. It is characterized in that a beam of pulsed laser is divided into two beams with the same light intensity utilized by a 1*2, 1:1 coupler, and then the two beams of light are coupled together into a 2*2, 1:1 coupler, from which the light is divided into two beams again with the same light intensity, meanwhile, pulses with double quantities and the same period are obtained by changing the optical path difference between the 1*2, 1:1 coupler and the 2*2, 1:1 coupler. Thus the repetition rate can be amplified.

The low-loss high-repetition-rate pulsed laser modulator is described above. It is characterized in that a 2*2, 1:1 coupler is utilized, which can not only couple two pulsed laser beams into one beam, can also divide one pulsed laser beam into two beams with the same light intensity. A major advantage of it is that the light loss can be very low in the whole process. However, if a 1*2, 1:1 coupler is utilized instead, there will be a loss close to 50%.

The low-loss high-repetition-rate pulsed laser modulator is described above. It is characterized in that a light delay module is utilized. The basic principle is to compute the period t between the two neighboring pulses according to the pulse repetition rate f. Then the fiber length difference $\Delta l$, which is $1/n$ the optical path difference between the two beams of light propagate before coupled together into a 2*2, 1:1 coupler, can be calculated by the formula, $$\Delta l = \left(kl + \frac{t}{2}\right) \cdot \frac{c}{n},$$

where, c is the light speed in vacuum, n is refractive index of the fiber core, k is natural number. Firstly, calculate a fiber length difference $\Delta l$ and complete the splicing of the two fibers having a fiber length difference $\Delta l$, compared with another two, and then modify $\Delta l$ by tapering the spliced fiber through a fiber delay module to compensate the length error in splicing process, so that a fiber length difference $\Delta l$ can be precisely controlled. Meanwhile, an oscilloscope is utilized to real-timely monitor the pulse signal, until a period of superposed pulse is obtained. Repetition rate is 2 times than it was.

The advantage of this invention is it provides a low-loss high-repetition pulsed laser modulator with simple devices, a compact structure and novel combination.

BRIEF DESCRIPTION OF THE DRAWINGS

FIG. 1 illustrates an embodiment of the high-repetition-rate pulsed laser modulator according the present invention, wherein: 1: 1*2, 1:1 coupler; 2: light delay module; 3: 2*2, 1:1 coupler; 4: light delay module; 5: 2*2, 1:1 coupler; 6: 2*2, 1:1 coupler; 7: light delay module; 8: 2*2, 1:1 coupler; 9: light delay module; 10: 1*2, 1:1 coupler.

DETAILED DESCRIPTION OF THE PRESENT INVENTION

The high-repetition-rate pulsed laser modulator provided by the present invention will be described as below in details in connection with the accompanying drawings by specific embodiments.

As shown in FIG. 1, the high-repetition-rate pulsed, laser modulator provided by the present invention includes two 1*2, 1:1 couplers (1 and 10), N 2*2, 1:1 couplers (3, 5, 6, 8 and so on), and N light delay modules (2, 4, 7, 9 and so on), wherein one beam of pulsed laser whereof repetition rate is f can be divided into two beams with the same light intensity by a 1*2, 1:1 coupler 1; one beam of light passes through a fiber having a fiber length difference $\Delta l$ compared with another, and a light delay module 2 used for modifying the fiber length difference $\Delta l$, then the two beams of light are coupled together into a 2*2, 1:1 coupler 3, the repetition rate of the output light now is 2f, In the same way, one beam of pulsed laser after 2*2, 1:1 coupler 3, passes through a fiber length difference $\Delta l$ and a light delay module 4, and then the two beams of light are coupled together into a 2*2, 1:1 coupler 5, the repetition rate of the output light is 4f, After N 2*2, 1:1 couplers, and so on, the repetition rate of the output light is $2^N f$, and then the two beams of light with the same light intensity are coupled together into a 1*2, 1:1 coupler 10, the repetition rate of the final output light is $2^{(N+2)} f$.

The present invention described above just includes 3 kinds of devices: a 1*2, 1:1 coupler, a light delay module and a 2*2, 1:1 coupler, so it has simple devices, a compact structure and novel combination.

We claim:
1. A low-loss high-repetition-rate pulsed laser modulator comprising:
  two 1*2, 1:1 couplers configured as an input end and an output end of the modulator respectively;
  at least two light delay modules arranged on a same light path between the two 1*2, 1:1 couplers; and
  at least one 2*2, 1:1 coupler with each arranged between two adjacent light delay modules;
  wherein the light delay modules are configured to control path-length difference Δl according to the following formula:

$$\Delta l = \left(kt + \frac{t}{2}\right) \cdot \frac{c}{n};$$

where, c is a velocity of light in vacuum, n is a refractive index of fibers, k is a natural number, and t is time difference between two neighboring pulses respectively transmitted in two light paths.

* * * * *